Figure 1:
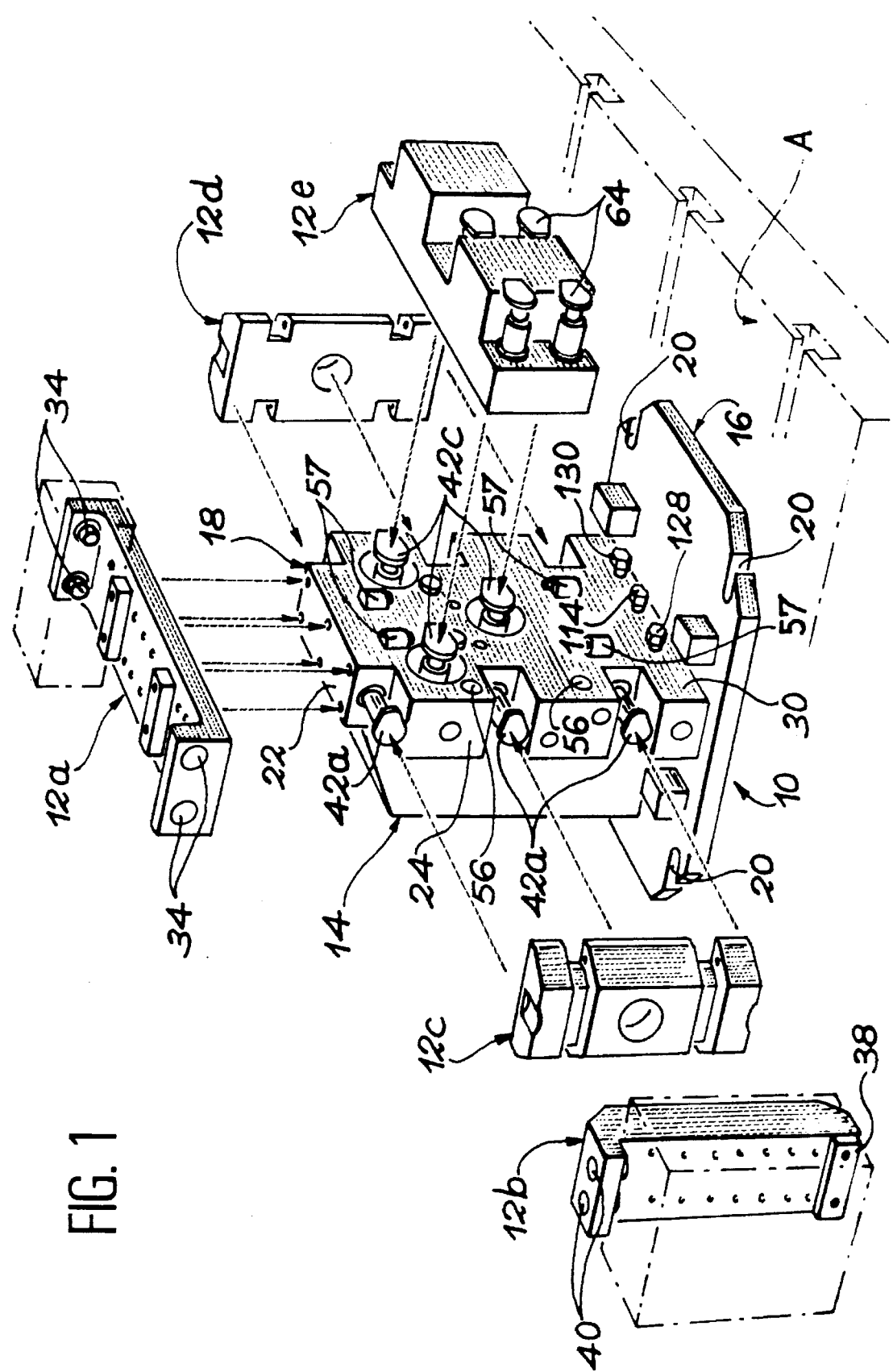

United States Patent [19]

Lanvin

[11] Patent Number: 5,582,397
[45] Date of Patent: Dec. 10, 1996

[54] GRIPPING TOOL FOR MACHINING PARTS ON A MACHINE TOOL

[75] Inventor: Hervé Lanvin, Bonnay, France

[73] Assignee: Aerospatiale Societe Nationale Industrielle, Paris, France

[21] Appl. No.: 562,794

[22] Filed: Nov. 27, 1995

Related U.S. Application Data

[63] Continuation of Ser. No. 175,377, filed as PCT/FR93/00509 May 25, 1993 published as WO93/24271, abandoned.

[30] Foreign Application Priority Data

May 26, 1992 [FR] France .................................. 92 06424

[51] Int. Cl.⁶ ......................................................... B23Q 7/00
[52] U.S. Cl. ............................. 269/25; 269/20; 269/309; 269/900; 269/152; 269/97; 269/95; 269/88
[58] Field of Search ..................................... 409/219, 225; 269/88, 20, 25, 27, 24, 32, 900, 95, 97, 98, 152, 309

[56] References Cited

U.S. PATENT DOCUMENTS

| | | | |
|---|---|---|---|
| 4,901,990 | 2/1990 | Frechette | 269/20 |
| 4,964,766 | 10/1990 | Turchan et al. | 269/900 |
| 4,968,012 | 11/1990 | Haddad et al. | 269/900 |
| 5,192,058 | 3/1993 | Van Dalsem et al. | 269/24 |

FOREIGN PATENT DOCUMENTS

| | | |
|---|---|---|
| 0209100 | 1/1987 | European Pat. Off. . |
| 0298168 | 1/1989 | European Pat. Off. . |
| 2530520 | 1/1984 | France . |
| 3341542 | 5/1985 | Germany . |
| 91 12925 | 9/1991 | WIPO . |

*Primary Examiner*—Robert C. Watson
*Attorney, Agent, or Firm*—Michael N. Meller

[57] ABSTRACT

For machining a part or a series of parts on a machine tool, it is proposed that said part be successively fixed in at least two different gripping modules (12a to 12e) mounted on a central unit (10) placed on the machining plate of the machine. The rapid assembly and disassembly of the modules with respect to the central unit is ensured by flanging jacks (42a,42c) actuated by a hydraulic control system (14) carried on the central unit. This system (14) also actuates control and locking jacks (34,40,64) ensuring the gripping of the parts on the modules (12a to 12e).

10 Claims, 5 Drawing Sheets

GRIPPING TOOL FOR MACHINING PARTS ON A MACHINE TOOL

This application is a continuation, of application Ser. No. 08/175,377, filed as PCT/FR93/00509 on May 25, 1993 published as WO93/24271, now abandoned.

DESCRIPTION

The invention relates to a gripping tool for fitting to a machine tool so as to permit the complete machining of a part or a series of parts on said machine tool.

The manufacture of parts having various different shapes on machine tools makes it necessary to place said parts in specific gripping tools having adapted shapes and sizes. In the state of the art, the said gripping tools are unitary members directly installed on the machine plate. Their putting into place and adjustment consequently makes it necessary to carry out a relatively long operating stoppage, which is prejudicial to the output of the machine.

Moreover, in view of the fact that the complete manufacture of a part makes it necessary to successively fit said part in two different gripping tools, the stoppage periods for the machine necessary for the fitting and the regulation of the gripping tools are doubled.

The invention specifically relates to a modular or non-unitary gripping tool making it possible to carry out a prior preparation and regulation of the active portions of the tool outside the machine tool, followed by an easy and rapid putting into place of said active portions and then all the parts or series of parts can be machined without requiring any complementary regulation or adjustment.

According to the invention, this result is obtained by means of a gripping tool for machining parts on a machine tool, characterized in that it comprises a central unit which can be mounted on a machining plate of a machine tool and having flanging means for the simultaneous fixing of at least two different gripping modules on the central unit, each of these gripping modules having means for gripping the parts to be machined, the central unit also having control means for actuating the flanging means and the gripping means.

In such a gripping tool, the central unit is installed on the machining plate of the machine tool and can receive different gripping modules adapted to the parts on which machining is to take place. In view of the fact that the fixing of the gripping modules to the central unit takes place rapidly at locations and in orientations which are clearly defined in an orthonormal reference linked with the machine, the settings can be carried out beforehand on each of the gripping modules before the latter are installed on the central unit. Thus, there is an appreciable time gain compared with the previously used gripping tools, which had to be regulated directly on the plate of the machine.

Moreover, the presence of several different gripping modules on the central unit makes it possible to successively use at least two different modules for performing the complete machining of a part. Thus, one of the gripping modules makes it possible to perform a first series of machining operations on the parts, after which the latter are placed in a second gripping module for performing a second series of machining operations using as the reference the surfaces machined during the first series of machining operations. In view of the fact that the gripping modules are set or regulated prior to their installation on the central unit, no regulation is required prior to the performance of the second series of machining operations.

According to a preferred embodiment of the invention, the flanging means incorporate first hydraulic jacks and the gripping means comprise second hydraulic jacks. The control means are then hydraulic control means acting on the first and second jacks.

Advantageously, the hydraulic control means have a first circuit acting on the first jacks and on the second jacks associated with the first gripping module by a given surface pressure, and a second circuit acting on the second jacks associated with the second gripping module by a regulatable pressure, below said surface pressure.

This feature makes it possible to avoid damaging already machined surfaces or the deformation of the part when the second series of machining operations is carried out.

Preferably, the first circuit comprises means for checking the maintenance of the service pressure above a minimum, predetermined pressure level and the second circuit comprises means for checking the regulatable pressure.

The first jacks are advantageously constituted by flanging jacks mounted on the central unit.

Moreover, as a function of the nature of the parts which are to be installed in the gripping modules, the second jacks can comprise control jacks mounted on the central unit in such a way as to act on mechanical locking members for the parts, mounted on the gripping module, control jacks mounted directly on the gripping module and acting once again on the mechanical locking members for the parts and mounted on said module, or locking jacks for the parts mounted directly on the gripping module.

The invention is described in greater detail hereinafter relative to a non-limitative embodiment and with reference to the attached drawings, wherein show:

FIG. 1 an exploded perspective view from the rear showing a gripping tool according to the invention.

Figure 2:
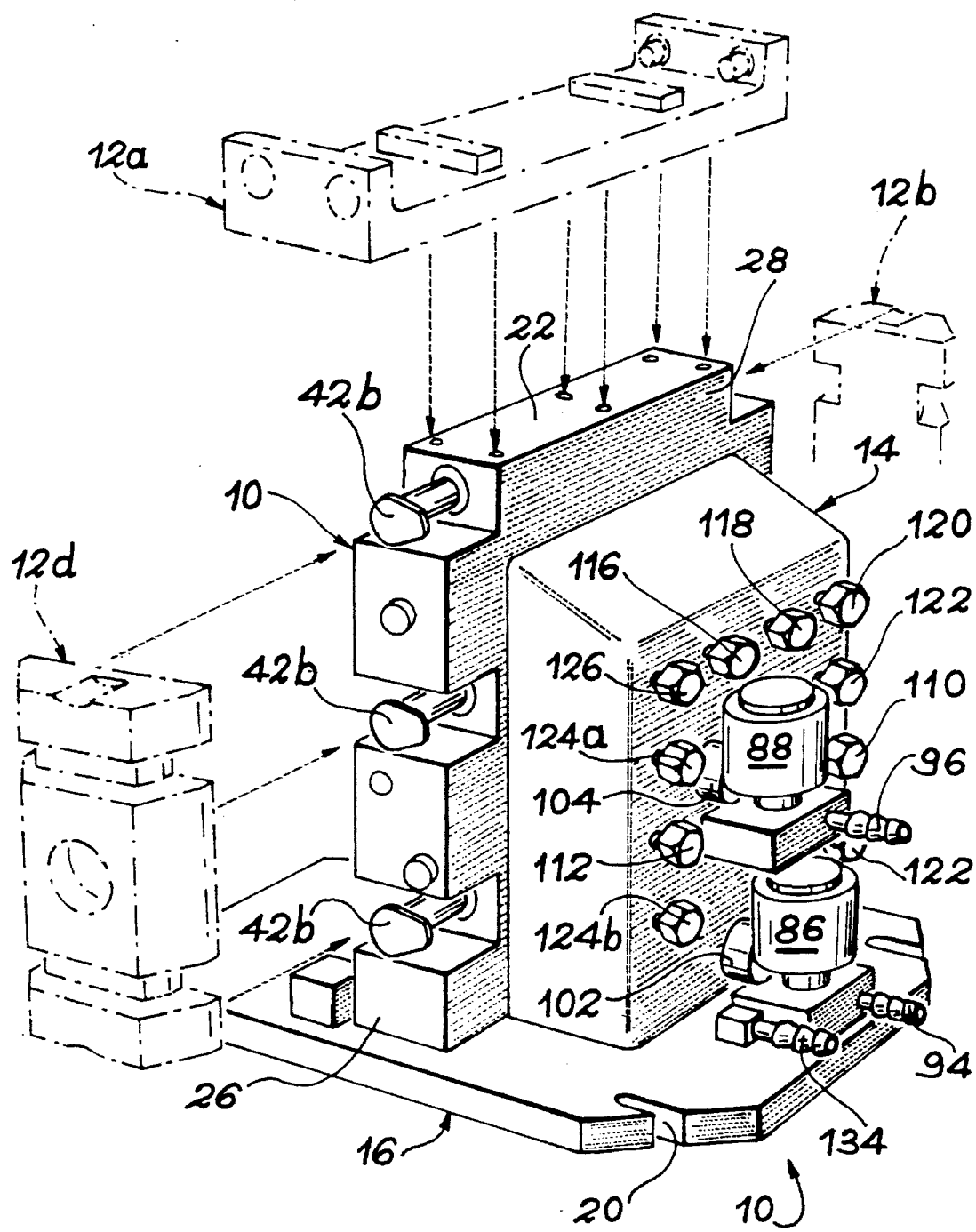

FIG. 2 a perspective view showing the central unit of the tool illustrated in FIG. 1 taken from the front.

Figure 3A:
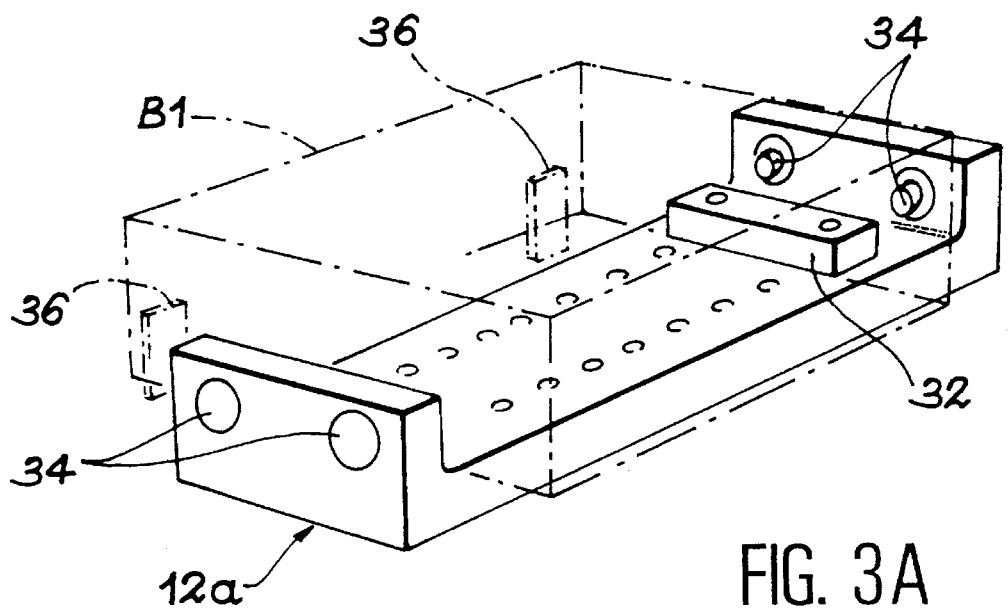
Figure 3B:
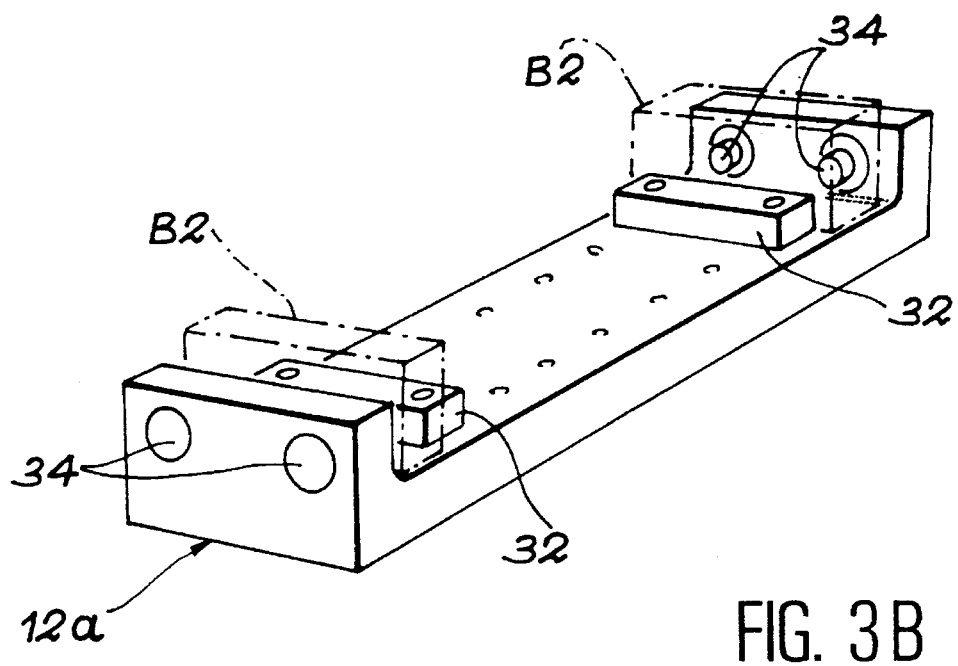

FIGS. 3A and 3B perspective views showing the horizontal vice of the tool illustrated in FIG. 1, respectively in the case where it is used for locking a part to be machined having relatively large dimensions and in the case where it is used for locking two parts having relatively small dimensions.

Figure 4:
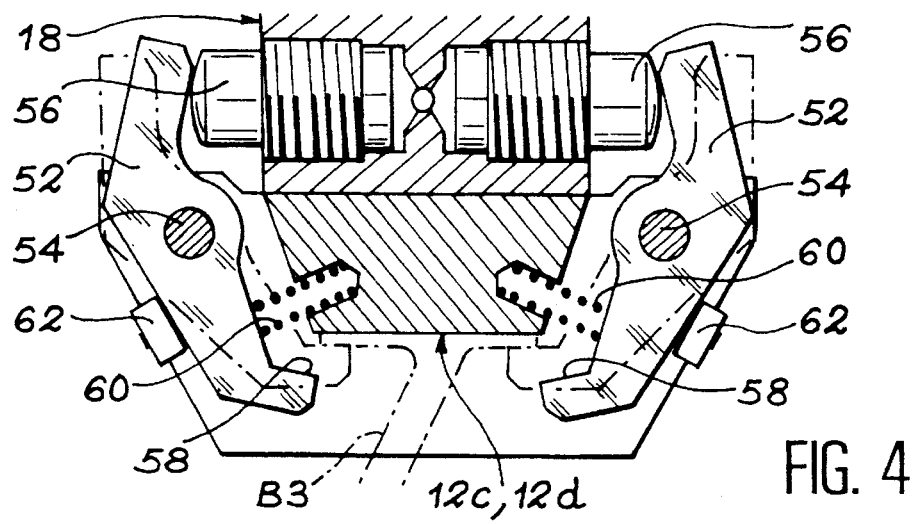

FIG. 4 a sectional view illustrating a module usable in the gripping tool of FIG. 1 and in which the flanging of the part is obtained by mechanical locking members controlled by jacks carried by the central unit.

Figure 5:
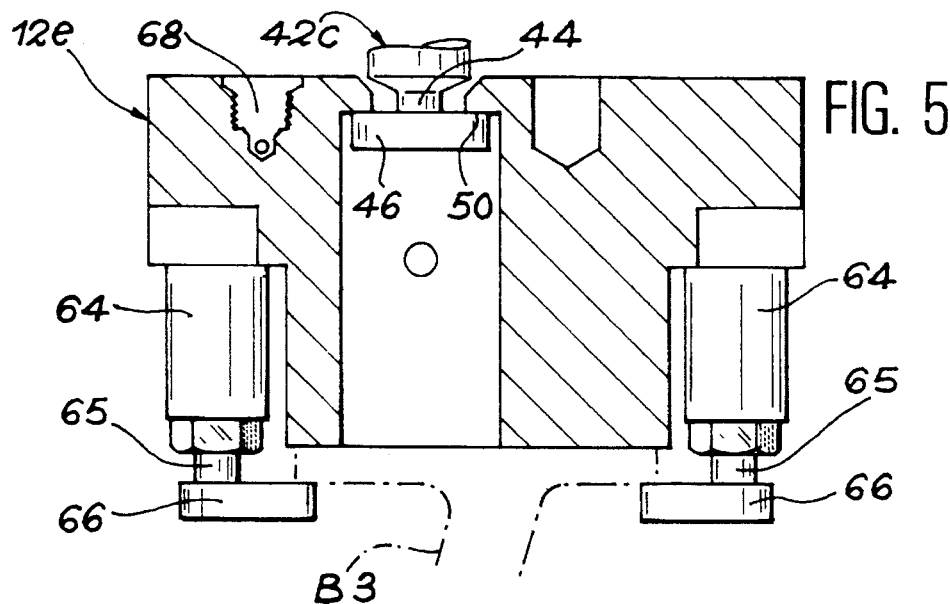

FIG. 5 a sectional view comparable to FIG. 4 showing another module usable in the tool of FIG. 1, said module being equipped with pivoting locking jacks directly ensuring the gripping of the part.

Figure 6:
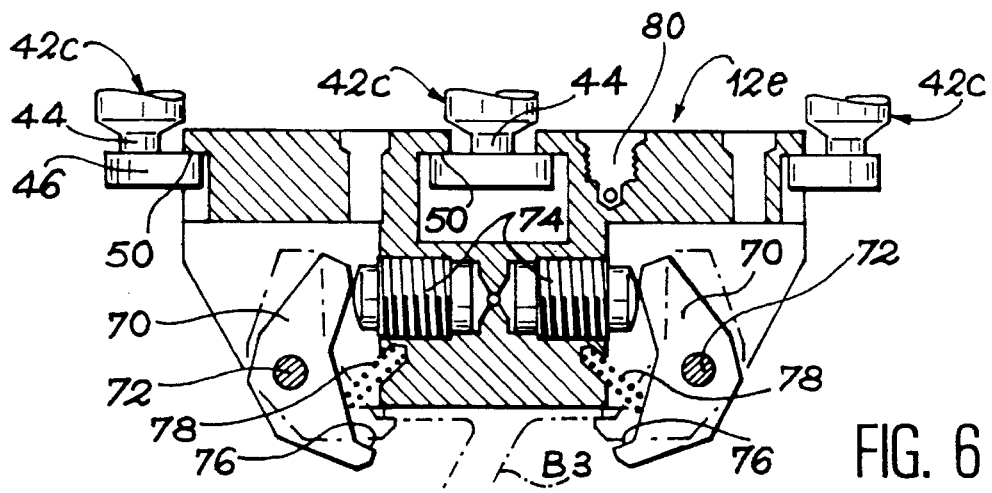

FIG. 6 a sectional view comparable to FIGS. 4 and 5 illustrating another module usable in the tool of FIG. 1, in which the parts are locked by control jacks mounted directly on the module and acting on the part via mechanical locking members.

Figure 7:
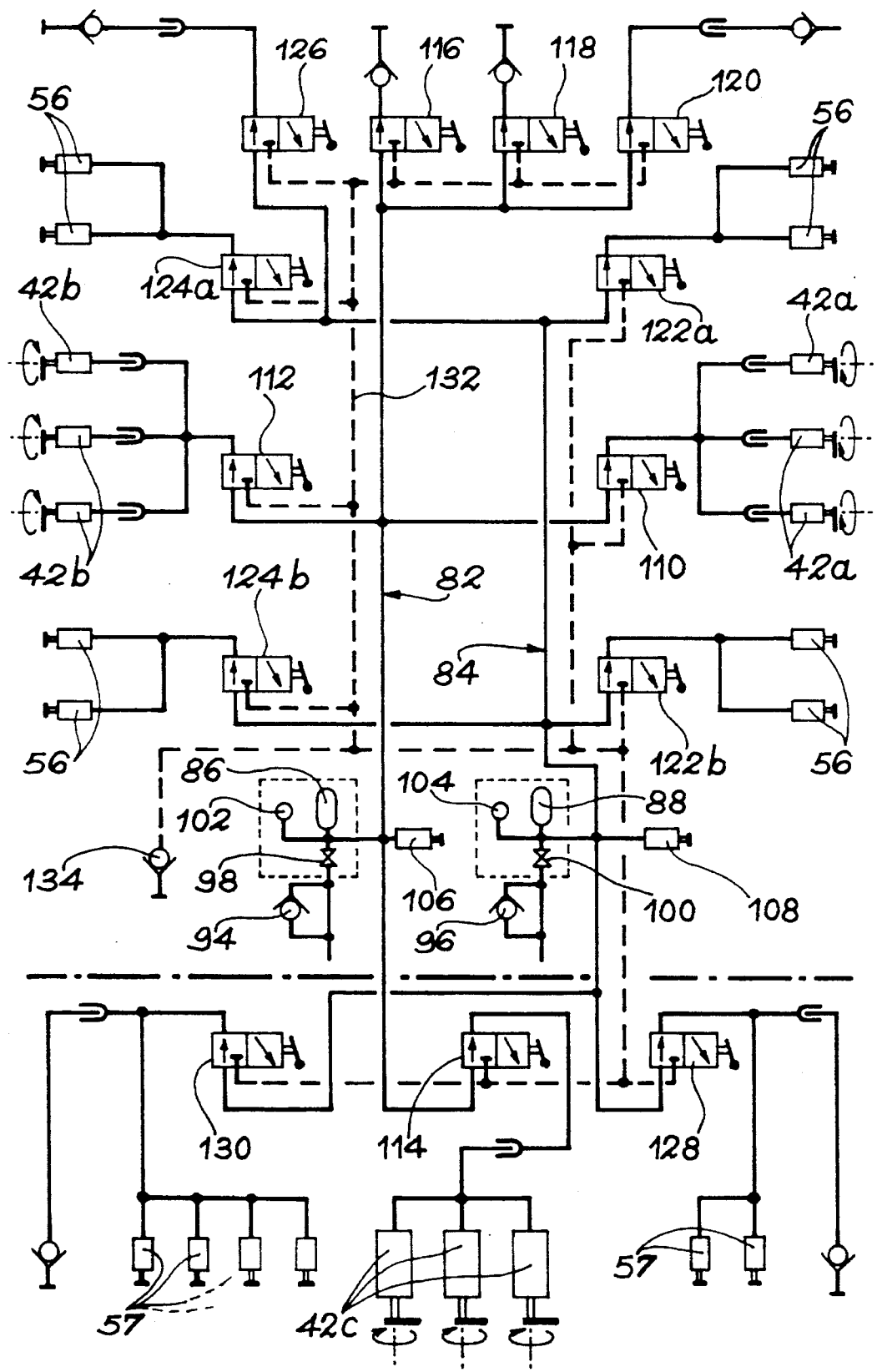

FIG. 7 a diagram illustrating the hydraulic control circuit for the gripping tool of FIG. 1.

The gripping tool according to the invention is installed on the machining plate of a machine tool, so as to permit the gripping of parts to be machined on said machine without long, prejudicial regulating, setting or adjusting operations having to be carried out on the machine when a modification takes place of the type of parts machined or when the complete machining of a part requires the dismantling thereof and then its grasping in a different way.

According to the invention this result is obtained by using a gripping tool like that shown in FIG. 1 constituted by a central unit 10 to be directly fitted to the horizontal machining plate A of the machine tool and a certain number of gripping modules like those designated by the references 12a to 12e in FIG. 1. Two to four of these gripping modules can be simultaneously fixed to the central unit 10 by hydraulic control means 14 carried by the latter.

As is more particularly illustrated by FIGS. 1 and 2, the central unit 10 is a mechanically welded structure having a horizontal base plate 16 and a vertical body 18. The base plate 16 is in the form of a rectangular plate for fixing to the horizontal machining plate A of the machine tool. The plate has for this purpose holes or notches 20 which can traverse dismantlable fixing members such as studs, screws or bolts (not shown).

The vertical body 18 is integral with the base plate 16 and rises in a direction perpendicular to the latter on its upper face. This vertical body 18 is generally parallelepipedic and has an upper face 22, two lateral faces 24,26, a front face 28 and a rear face 30. As is particularly illustrated by FIG. 2, the front face 28 carries the control means 14, whose detailed description will be given hereinafter. The other faces 22,24, 26 and 30 are designed for receiving gripping modules such as the modules 12a to 12e in FIG. 1, via flanging means which can be rapidly manipulated with the aid of control means 14. This arrangement makes it possible to carry out the settings of the different gripping modules 12a to 12e before they are mounted on the central unit 10. The time losses associated with these setting operations are consequently reduced to the minimum.

In the embodiment illustrated in FIG. 1, the different gripping modules which can be mounted on the central unit 10 include a horizontal vice 12a, a vertical vice 12b and three modules 12c,12d and 12e. In this case and differently as compared with the other gripping modules, the horizontal vice 12a is normally permanently fixed to the upper face 22 of the vertical body 18, e.g. by means of six, not shown screws. The vertical vice 12b and the modules 12c, 12d are placed on lateral faces 24,26 of the vertical body 18 by flanging means controlled by the control means 14. In the same way, the module 12e is fixed to the rear face 30 of the vertical body 18 by flanging means controlled by the control means 14. As is more particularly illustrated in FIGS. 1 and 2, the flanging means by which the vertical vice 12b and modules such as the modules 12c and 12d can be interchangeably fixed to the lateral faces 24,26 of the vertical body 18 of the central unit 10 have on each of its lateral faces three aligned flanging jacks, respectively designated 42a and 42b for the faces 24 and 26.

In a comparable way, a module such as the module 12e is fixed to the rear face 30 of the vertical body 18 of the central unit 10 by three flanging jacks 42c, as illustrated in FIG. 1. As will be shown hereinafter, each of the groups of flanging jacks 42a,42b,42c is simultaneously controlled from the control means 14.

The flanging jacks 42a,42b,42c are all identical and are preferably constituted by single-action, quarter-turn hydraulic jacks. As is particularly illustrated in FIGS. 5 and 6, each of these jacks has a rod 44, mobile in rotation and in translation and whose end carries a flange 46.

When the jack is inoperative, said flange 46 projects beyond the corresponding face 24,26 or 30 of the vertical body 18 and has an angular orientation so that it does not prevent the application of the appropriate gripping module against the said face.

When the flanging jacks 42a,42b or 42c are actuated, the rods 44 carrying the flanges 46 firstly pivot by a quarter-turn, which has the effect of bringing these flanges in front of flanging surfaces such as the surfaces 50 in FIGS. 5 and 6 and provided on the corresponding gripping module. Secondly the rods 44 of the jacks are retracted towards the interior of the vertical body 18, which makes the flanges 46 bear against the surfaces 50 and consequently fix the corresponding gripping module to the central unit 10.

When the flanging jacks are actuated in the release direction, the hydraulic pressure ensuring the flanging of the gripping modules is released and return springs incorporated into the jacks return the latter to their initial positions. Thus, the gripping modules are immediately freed and can be dismantled and replaced at random.

As is more particularly illustrated by FIGS. 3A and 3B, the horizontal vice 12a is substantially U-shaped and the intermediate, horizontal branch can support, as a function of the size of the parts to be machined, one or two fixed jaws 32. More specifically, a single fixed jaw 32 is used in the manner illustrated in FIG. 3A when it is wished to machine a relatively large part B1, whereas two fixed jaws 32 can be used for simultaneously machining two relatively small parts B2, as illustrated in FIG. 3B.

The position occupied by the fixed jaw or jaws 32 on the intermediate branch of the U formed by the horizontal vice 12a can be regulated as a function of the size of the part or parts to be machined. Thus and in exemplified manner only, the fixed jaw or jaws 32 can cooperate with said intermediate branch by a not shown, rack-type tooth system making it possible to displace the longitudinally fixed jaws in accordance with a given pitch, which is smaller than the travel of the locking jacks associated with the vice 12a. For example, the pitch defined by the rack-type tooth system can be 10 mm if the maximum travel of the jacks is 16 mm.

As is also illustrated by FIGS. 3A and 3B, each of the two vertical branches of the horizontal vice 12a supports two locking jacks 34, whereof an actuation makes it possible to lock the part or parts to be machined between the said jacks and the fixed jaw or jaws 32.

More specifically and as illustrated in FIG. 3A, when a large part B1 has to be fixed in the horizontal vice 12a, said part is fixed between one of the pairs of jacks 34 and one of the fixed jaws 32, the other pair of locking jacks 34 remaining unused. The second fixed jaw 32 is then dismantled. However, when two small parts B2 are placed in the horizontal vice 12a, as illustrated in FIG. 3B, each of these parts is fixed between one of the pairs of locking jacks 34 and one of the fixed jaws 32.

Advantageously, the horizontal vice 12a also has one or two lateral stops 36 (FIG. 3A), whose position can be manually regulated by the operator. A not shown, graduated slide associated with each lateral stop 36 makes it possible to render its position visible. As is more particularly illustrated by FIG. 3A, the lateral stops 36 facilitate the positioning of the part to be machined in the horizontal vice 12a.

The hydraulic fluid supply of the two pairs of locking jacks 34 from the control means 14 carried on the central unit 10 takes place via two, not shown hydraulic couplers. Although the vice 12a is normally permanently fixed to the central unit 10, this feature permits an optional dismantling of said vice, e.g. when a particular machining process requires the installation of a special module on the upper face 22. This solution is imposed when manufacturing requirements make it necessary to place in the horizontal vice 12a a part whose dimensions are greater than the capacity of said vice.

In the embodiment illustrated in FIG. 1, the vertical vice 12b is a L-shaped vice, whose vertical branch supports a fixed jaw 38 and whose horizontal branch supports a pair of locking jacks 40. Like the fixed jaw or jaws 32 of the horizontal vice 12a, the fixed jaw 38 can be mounted on the vertical branch of the vertical vice 12b at regulatable locations. As a result of this configuration, parts having different dimensions can be locked between the fixed jaw 38 and the pair of locking jacks 40.

Like the horizontal vice 12a, the vertical vice 12b is advantageously equipped with at least one, not shown lateral stop, whose position can be regulated in the same way as the lateral stops 36 of the horizontal vice 12a.

The hydraulic fluid supply of the pair of jacks 40 of the vertical vice 12b from the control means 14 of the central unit 10 takes place through a coupler identical to the two couplers supplying the two pairs of jacks 34 of the horizontal vice 12a.

In general, the vices 12a and 12b are used for gripping the part to be machined on the machine tool, when said part is in the form of a rough delivery or a blank. A first series of machining operations can then be performed on the machine tool.

However, the modules such as the modules 12c,12d and 12e of FIG. 1, are designed so as to permit the gripping of parts to be machined on the machine tool after the performance of said first series of machining operations. The surfaces machined during the first series of machining operations then serve as a reference for the positioning and flanging of the semi-finished part in one of the modules. Thus, each module is adapted to the part to be machined. When the semifinished part is positioned and flanged in the corresponding module, a second series of machining operations is carried out. At the end of this second series of operations, the part is completely machined.

In view of the fact that the vertical vice 12b and each of the modules 12c to 12e can be rapidly uncoupled and coupled with respect to the central unit 10 and that said coupling places the vice and the modules in spatial orientations clearly defined on the basis of orthonormal references linked with the machine tool, it is clear that a prior setting of the vice and the modules makes it possible to perform the complete machining of a part reducing to a minimum the machine tool operational stoppages. Thus, these stoppages are limited to the time necessary for installing the vice or the modules on the central unit and for the assembly and disassembly of the part with respect to the gripping modules in question.

The control means 14, which ensure the actuation of the flanging means constituted by the different flanging jacks 42a,42b and 42c, and the actuation of the gripping means constituted by the locking jacks 34 and 40 of the vices 12a and 12b, also control the gripping means carried on the different modules 12c,12d and 12e. These latter gripping means can have different forms and they will now be described relative to FIGS. 4 to 6.

With regards to the modules such as 12c and 12d in FIGS. 1 and 2 for installation on the lateral faces 24,26 of the vertical body 18 of the central unit, they can be equipped either with mechanical locking members actuated by jacks mounted on the central unit and as illustrated in FIG. 4, or jacks directly ensuring the locking of the parts, as illustrated in FIG. 5.

On firstly referring to FIG. 4, it can be seen that the modules 12c and 12d can be equipped with mechanical locking members 52 in the form of substantially V-shaped levers articulated in their central portion to the module by spindles 54.

One of the ends of each of the mechanical locking members 52 is positioned facing the front face 28 or rear face 30 of the vertical body 18 of the central unit, so as to bear on the end of a rod of a control jack 56 or 57 mounted in the vertical body 18. The jacks 56,57 can in particular be single-action, linear hydraulic jacks.

The opposite end of each of the mechanical locking members 52 has a bearing surface 58 able to come into contact with a machined surface of the semifinished part B3 which has to be installed in the corresponding module. When the control jacks 56,57 are actuated, the part is fixed in the module. During the release of the control jacks 56,57 a return spring 60 placed between the module and each of the mechanical locking members 52 returns the latter to an inoperative position, illustrated in continuous line form in FIG. 4, in which the bearing 10 surface 58 frees the part B3 mounted in the module. This inoperative position is determined by the bearing of the mechanical locking member 52 against a stop 62 integral with the module.

When the gripping of the part on the module is ensured in the manner described relative to FIG. 4, the locking of the part or parts involves no hydraulic assistance.

As illustrated in FIG. 5, the gripping of the parts on the modules such as 12c and 12d which can be installed on the lateral faces 24,26 of the vertical body 18 of the central unit, can also take place by means of locking jacks 64, which are constituted in the same way as the flanging jacks 42a,42b and 42c by single-action, quarter-turn hydraulic jacks. In this case, the gripping of the part B3 is ensured by the flange 66 fixed to the end of the rod 65 of each of the jacks 64. When the gripping of the parts on the modules is ensured in the manner described relative to FIG. 5, the passage of hydraulic fluid between the control means 14 carried by the central unit and the locking jack 64 is ensured by couplers constituted by two half-couplers respectively mounted on the vertical body 30 and on the module. The half-coupler 68 mounted on the latter is visible in FIG. 5. Each of the half-couplers is in the form of a cylinder normally closed by a piston. When the module is coupled to the central unit, the joining of the two half-couplers automatically releases the passage of the pressurized hydraulic fluid.

It should be noted that the not shown couplers also located between the vices 12a and 12b and the central unit are produced in an identical manner.

With regards to the modules such as the module 12e for fixing to the rear face 30 of the vertical body 18 of the central unit, they can be equipped with gripping means constituted by hydraulic locking jacks 64 like single-action, quarter-turn jacks as described relative to FIG. 5, or gripping means constituted by mechanical locking members actuated by single-action, linear control jacks mounted on modules in the manner illustrated in FIG. 6.

With reference to FIG. 6, it is possible to see the mechanical locking members 70 mounted on the module 12 are constituted by substantially V-shaped levers articulated in their central portion to the body of the module by spindles 72. A first end of each of the mechanical locking members 70 is positioned facing the rod of a single-action, linear hydraulic jack 74 mounted in the module. The opposite end of each member 70 has a bearing surface 76 making it possible to fix the part to the module.

As for the mechanical locking members 52 described hereinbefore relative to FIG. 4, return springs 78 are placed between the module and each of the members 70 in order to bring the latter into an inoperative position (illustrated in continuous line form in FIG. 6), in which the bearing surface 76 is spaced from the part B3, when the corresponding jacks 74 are not actuated. In this case there is no need for a stop, because the control jacks 74 are directly carried by the module. As hereinbefore, the transfer of pressurized hydraulic fluid between the control means 14 installed on the central unit and the module 12e is ensured by a hydraulic coupler formed from two half-couplers, whereof one is shown at 80 in FIG. 6.

The hydraulic control means 14 ensuring the actuation of the flanging jacks of the different gripping modules on the central unit and gripping means by means of which the parts can be locked in the gripping modules will now be described relative to FIG. 7.

It is firstly pointed out that these hydraulic control means have two separate hydraulic circuits designated by the references 82,84 in FIG. 7. The existence of two separate hydraulic circuits is explained by the fact that certain of the jacks equipping the gripping tool according to the invention must be actuated with a relatively high service pressure, whereas other jacks only have to be actuated with a reduced pressure.

More specifically, the fixing of the vices and modules to the central unit must be reliable and therefore requires a high actuating pressure. This also applies with respect to the locking of the parts in the vices 12a,12b, because the latter bear on the surfaces of parts which have not been completely machined. Consequently the flanging jacks 42a,42b and 42c, as well as the locking jacks 34,40 of the vices are supplied by the first circuit 82 at a high service pressure of e.g. approximately 500 bars.

However, the jacks 56,57,64,74 directly or indirectly ensuring the gripping of the parts on the modules, must be actuated with a reduced and preferably regulatable pressure, because the surfaces of the parts used for ensuring the gripping action are already machined surfaces, which must not be damaged. Therefore these different jacks 56,64 and 74 are controlled by the second circuit 84.

Moreover, the pressure source used for supplying the two circuits 82 and 84 is constituted by a not shown, hydraulic station, which is only connected to the two circuits 82 and 84 during the phases preceding machining. More specifically, all the manipulations of the different buttons equipping the control means 14 and used for actuating the different jacks of the gripping tool take place when the hydraulic station is connected to the two circuits. An accumulator 86 and 88 in each of the circuits maintains the pressure in said circuits for a predetermined time period, e.g. ten days, which is adequate for machining the complete series of parts.

The hydraulic station is designed for supplying the first circuit 82 with a constant service pressure, which can be equal to 500 bars. Moreover, the hydraulic station supplies the second circuit 84 with a modifiable pressure, which is lower than the service pressure supplied to the first circuit 82. This variable pressure can e.g. be between approximately 175 and 500 bars.

The supply of pressure from the hydraulic station to one or other of the circuits 82 and 84 takes place by two flexible tubes equipped with high-speed connectors operated by the operator. A second flexible tube equipped with a high-speed connector is linked with one of the said flexible tubes in order to permit a hydraulic fluid return to the hydraulic station by a different circuit.

To permit its connection to the hydraulic station, each of the circuits 82 and 84 has a coupling unit. Each of these coupling units comprises a high-speed connector or coupler 94,96, which can be connected to the high-speed connector of the corresponding flexible tube. Directly downstream of these high-speed couplers 94,96 are placed stop valves 98,100. The accumulators 86,88 and the visual checking pressure gauges 102,104 are connected in bypass in the coupling units directly downstream of the stop valves 98,100.

It should be noted that in addition to their function of maintaining the pressure in each of the circuits 82,84 when the gripping tool is uncoupled from the hydraulic station, each of the accumulators 86,88 makes it possible to compensate pressure variations due to temperature differences and any microleaks which may occur in the two circuits. Downstream of the coupling units, each of the circuits 82,84 is respectively equipped with a control jack 106,108.

The control jack 106 in the circuit 82 maintains the pressure in said circuit above a minimum, predetermined pressure value during the machining phases. This minimum pressure is chosen so as to guarantee a safe and reliable operation of the gripping tool. It should be approximately 400 bars in the case where the service pressure in the circuit 82 is approximately 500 bars. When the pressure in the circuit 82 exceeds 400 bars, the rod of the control jack 106 projects out of the jack body. However, the rod is completely retracted if the pressure is below this value.

A sensing of the rod of the control jack 106 at any random programmed time of the machining cycle and carried out by means of a robot, makes it possible to check that the pressure in the circuit 82 is well above the minimum required value. The machining cycle can then continue. However, if the rod of the control jack 106 is retracted, the lack of sensing of said rod stops the machining cycle until the anomaly has ended.

The control jack 108 placed in the circuit 84 does not have an all or nothing type operation in the same way as the jack 106 and instead functions in a continuous manner. More specifically, the rod of the jack passes to a greater or lesser extent out of the jack body as a function of the pressure prevailing in the circuit 84. In this case, a sensor controlled by a robot checks the position of the rod to know whether the pressure in the circuit 84 is compatible with the security requirements inherent in the gripping means actuated by said circuit 84. Different means such as an instruction card, a colour reference or a marking make it possible to guide the operator in the task to be carried out.

As is illustrated in detail in FIG. 7, the circuit 82 supplies the service pressure for the three flanging jacks 42a installed on the lateral face 24 by means of a control button 110, the three flanging jacks 42b mounted on the lateral face 26 of the vertical body of the central unit by means of a control button 112 and the three flanging jacks 42c mounted on the rear face 30 by means of a control button 114.

The circuit 82 also supplies each of the pairs of locking jacks 34 installed on the horizontal vice 12a by two control buttons 116,118. Finally, by means of a control button 120, the circuit 82 can supply the pair of locking jacks 40 of the vertical vice 12b or the module which may replace said vice, on the lateral face 24 of the vertical body 18 of the central unit 10.

In turn, the second circuit 84 supplies, by means of two control buttons 122a,122b, two pairs of jacks 56 installed in the central unit, so as to permit the locking of a part on a module placed on the lateral face 24, in the case where a module according to FIG. 4 is used. In a comparable manner, said same circuit 84 supplies by means of two control buttons 124a,124b two other pairs of control jacks 56 mounted in the central unit, so as to permit the locking of a part in a module mounted on the lateral face 26 and not having any hydraulic member.

By means of a control button 126, the circuit 84 also supplies single-action, quarter-turn-type locking jacks 64 when such jacks are installed on the module placed on the lateral face 26 of the vertical body of the central unit.

By means of a control button 128, the circuit 84 also supplies a pair of control jacks 57 installed in the central unit for controlling the mechanical flanging members carried by a module such as 12e mounted on the rear face 30 of the vertical body 18, as well as control jacks 74 mounted on said same module, on the side of the face 24 of the vertical body 18.

In a comparable manner, the circuit 84 supplies by means of a control button 130 four control jacks 57 installed in the vertical body 18 and control jacks 74 installed in a module fixed to the rear face 30 of said vertical body, so as to ensure the locking of the parts on said module on the side of the lateral face 26.

As illustrated by FIGS. 1 and 2, the different control buttons 110 to 130 are installed on the central unit so as to be easily manipulatable by the operator. A quarter-turn rotation of each of the buttons changes the state of the corresponding jack or jacks.

In FIG. 7, the different couplers placed between the central unit and each of the gripping modules are also shown. As can be gathered from FIG. 7, the hydraulic control means also have a hydraulic fluid return circuit 132 connected to each of the control buttons 110 to 130 and which communicates with the central unit in order to permit the return of the hydraulic fluid to the latter, by a hydraulic coupler 134, when the central unit is connected to said hydraulic station.

Obviously, the invention is not limited to the embodiment described in exemplified manner hereinbefore and covers all variants thereof. Thus, the number and nature of the gripping means associated with the different gripping modules can differ from those described hereinbefore. In this case, the hydraulic control means illustrated in FIG. 7 can assume different forms adapted to the particular arrangement of these gripping means.

I claim:

1. Gripping tool for machining parts on a machine tool having a machining plate, said gripping tool comprising:

a central unit adapted to be installed on the machining plate; and at least two different gripping modules adapted to be mounted on the central unit, with each gripping module incorporating means including at least one movable member and one fixed member for gripping the parts to be machined;

wherein the central unit includes:

means for affixing the central unit to said machining plate flanging means for simultaneously fixing said at least two different gripping modules on the central unit; and control means for actuating the flanging means and the gripping means.

2. Tool according to claim 1, wherein the flanging means incorporate first hydraulic jacks, the gripping means incorporating second hydraulic jacks and the control means are hydraulic control means acting on the first and second jacks.

3. Tool according to claim 2, wherein the gripping modules incorporate at least one first gripping module for a first machining operation for the parts and a second gripping module for a second machining operation for the parts, the hydraulic control means having a first circuit acting on the first jacks and on the second jacks associated with the first gripping module by a given service pressure, and a second circuit acting on the second jacks associated with the second gripping module by a regulatable pressure below said service pressure.

4. Tool according to claim 3, wherein the first circuit comprises control means for maintaining the service pressure above a minimum, predetermined pressure level and in that the second circuit comprises control means for the regulatable pressure.

5. Tool according to claim 2, wherein the first jacks are flanging jacks mounted on the central unit.

6. Tool according to claim 2, wherein the second jacks comprise control jacks mounted on the central unit so as to act on mechanical locking members for the parts mounted on a gripping module fixed to the central unit by flanging means.

7. Tool according to claim 2, wherein the second jacks comprise control jacks mounted on a gripping module and acting on mechanical locking members for the parts mounted on said module.

8. Tool according to claim 2, wherein the second jacks comprise locking jacks for the parts mounted on the gripping modules.

9. Tool according to claim 5, wherein the flanging jacks and the locking jacks are quarter-turn jacks.

10. A gripping tool as defined in claim 2, wherein said control means includes at least one hydraulic circuit and at least one accumulator carried by the central unit for maintaining pressure in the hydraulic circuit over a predetermined time period.

* * * * *